United States Patent
Kemp et al.

[19]

[11] Patent Number: 6,124,549
[45] Date of Patent: Sep. 26, 2000

[54] ELECTRICAL STRESS CONTROL

[76] Inventors: Christian Kemp, Mühlenpfad 10, D-53179 Bonn; Georg Bachmaier, Hannezogl 2, D-83558 Maitenbeth; Hansjoerg Gramespacher, Isarstrasse 8, D-85579 Neubiberg, all of Germany

[21] Appl. No.: 09/101,484

[22] PCT Filed: Jan. 14, 1997

[86] PCT No.: PCT/GB97/00092

§ 371 Date: Sep. 17, 1998

§ 102(e) Date: Sep. 17, 1998

[87] PCT Pub. No.: WO97/26693

PCT Pub. Date: Jul. 24, 1997

[30] Foreign Application Priority Data

Jan. 16, 1998 [GB] United Kingdom .................. 9600819

[51] Int. Cl.[7] .................. H02G 15/064; H02G 15/103; H02G 15/184
[52] U.S. Cl. .................. 174/73.1; 524/432; 428/389; 428/418; 428/416; 428/450; 428/463; 423/622; 523/459; 264/60; 264/56
[58] Field of Search .................. 524/432; 174/73.1; 428/389, 418, 416, 450, 463; 423/622; 523/459; 264/60, 56

[56] References Cited

U.S. PATENT DOCUMENTS

| | | | |
|---|---|---|---|
| 3,631,519 | 12/1971 | Salahshourian | 174/73 R |
| 3,644,662 | 2/1972 | Salahshourian | 174/73 R |
| 4,275,261 | 6/1981 | Fillie et al. | 174/73 R |
| 4,297,250 | 10/1981 | Gupta et al. | 252/518 |
| 4,418,240 | 11/1983 | Chazelas | 174/73 R |
| 4,431,861 | 2/1984 | Clabburn et al. | 174/73 R |
| 4,458,103 | 7/1984 | Irie et al. | 174/73 R |
| 4,551,915 | 11/1985 | Larsson | 29/858 |
| 4,731,199 | 3/1988 | Matsuo et al. | 252/511 |
| 5,276,080 | 1/1994 | Oku | 524/432 |

FOREIGN PATENT DOCUMENTS

| | | | |
|---|---|---|---|
| 0 005 387 A1 | 11/1979 | European Pat. Off. | H01C 7/10 |
| 0 121 986 A1 | 10/1984 | European Pat. Off. | H02G 15/068 |
| 0 681 911 A1 | 11/1995 | European Pat. Off. | B32B 15/08 |
| 2 454 205 | 11/1978 | France | H02G 15/02 |
| 2 547 451 | 6/1983 | France | H01B 1/08 |
| 62-135515 | 6/1987 | Japan | C08G 18/69 |
| 0902705 | 8/1962 | United Kingdom . | |
| WO 86/01634 | 3/1986 | WIPO | H01B 7/18 |
| WO 91/16564 | 10/1991 | WIPO | F16L 11/00 |

OTHER PUBLICATIONS

Patent Abstracts of Japan (PAJ) and World Patent Index (WPI) abstracts of JP 6–116502 (Apr. 1994).

Strumpler et al., "Smart Varistor Composites," *Proceed. 8th CIMTEC Ceramic Cong. & Forum New Mater. Symp.*, pp. 15–22 (Jun. 29, 1994–Jul. 4, 1994).

WPI Abstract No. 89–170570/198923 (abstract of JP 1–113466 (May 1989).

WPI Abstract No. 89–216536/198930 (abstract of JP 1–153770 (Jun. 1989)).

WPI Abstract No. 92–052346/199207 (abstract of JP 3–295110 (Dec. 1991)).

Search Report for International Application No. PCT/GB97/00092 (Apr. 14, 1997).

Search Report for Application No. GB 9600819 (Apr. 10, 1996).

*Primary Examiner*—Robert Dawson
*Assistant Examiner*—Kuo-Liang Peng
*Attorney, Agent, or Firm*—Myers Bigel Sibley & Sajovec

[57] ABSTRACT

A composition for use as an electrical stress controlling layer (12) for use with cable joints and terminations has a non-linear V-I characteristic. The composition comprises a polymeric matrix filled with doped zinc oxide varistor powder. The particulate filler is sieved at 125 micrometers, calcined at 1100° C., and lightly ground to maintain the spherical shape of the particles. More than 50% by weight of the particles have a maximum dimension between 5 and 100 micrometers.

25 Claims, 2 Drawing Sheets

ELECTRICAL STRESS CONTROL

This invention relates to the control of electrical stress, and in particular to a composition of matter for effecting electrical stress control, and its application to the jointing or termination of electrical power cables, for example.

Electrical equipment, including power cables, operating at medium voltage, say about 10 kV and above, can be subject to electrical stresses that may not be sufficiently controlled by a material that is essentially only electrically insulating. It is known to employ stress control material particularly for such applications. Such material may be classed as 'linear' or as 'non-linear'. A linear stress control material obeys Ohm's law:

$$I=kV,$$

where
I=current
V=voltage, and
k is a constant.

A non-linear material obeys a generalised form of this equation $$I=kV^\gamma,$$

where γ is a constant greater than 1, whose value depends on the material under consideration.

EP-B-0121986 (Raychem), for example, discloses the termination of a high voltage cable in which a layer of linear stress control material is used in combination with a layer of non-linear stress control material. The material for each layer may be selected from a variety of materials comprising filled polymers.

A paper published in the Proceedings of the 8th CIMTEC Ceramic Congress and Forum on Materials Symposium, Florence, Jun. 29 to Jul. 4, 1994, by Strümpler, Kluge-Weiss and Greuter of ABB, entitled Smart Varistor Composites, describes a material comprising doped ZnO varistor powder as a filler in a polymeric matrix. Proposed applications of the material are exemplified as the suppression of voltage transients or field grading in bushings and cable terminations. The filler is prepared by sintering the powder under conditions ranging from 935° C. to 1320° C. and 4 hours to 20 hours respectively. The shape of the filler particles is said to be almost spherical. It is indicated that agglomerates can have diameters from about 3 micrometers to about 300 micrometers, and that by sieving before or after sintering, a special size fraction can be chosen. The sample prepared is sieved to a particle size of <200 micrometers. The resultant material has a non-linear current/voltage characteristic.

FR-A-2547451 (Electricité De France) discloses a non-linear resistance material for use in distributing voltage in a cable termination. The material comprises a bond or binding agent, which may be a polymeric material, and a ceramic powder based on doped zinc oxide. In this publication, the mass percentage of the powder (the zinc oxide), and its particle size are shown to be the two essential characteristics of the material, with the zinc oxide forming at least 50% of the total mass, and at least 50% of the grains of the powder having a diameter greater than 100 µm. The material is shown to be non-linear, with the field strength varying smoothly with current density. The ceramic powder is obtained by crushing a pellet of the material that has been sintered at high temperature (800–1500° C.). That is to say, the initial particles of zinc oxide are compressed at high temperature into a coherent solid body, or pellet, of the kind used as a varistor in high voltage lightning arresters, which is then crushed by means of a planetary agate marble crusher to form the powder. Such crushing results in particles of irregular and usually jagged shape. The non-linearity of the resulting powder is shown to improve as its particle size increases, at a constant percentage (85%) of powder in the total composition. A particle size between 140 µm and 200 µm is preferred to a size of 100 µm to 140 µm. Samples having a particle size of less than 100 µm are shown to be significantly less non-linear.

U.S. Pat. No. 4,297,250 (Westinghouse) discloses a method of making a ZnO powder composition exhibiting non-linear V-I characteristics. A mass of agglomerated particles is pressed to provide a cohesive pressed green body that is then heated at between 1050° C. and 1400° C. for a time to sinter the particles together. The sintered body is then crushed to provide finely divided powder particle fragments. The fragments are sieved and heated at between 500° C. and 1050° C. and subsequently broken up to provide a finely divided powder exhibiting non-linear V-I characteristics. It will be appreciated that the pressure of the sintering and subsequent grinding steps will significantly change the shape of the particles from their initial regular shape to an irregular shape, as shown in FIGS. 1 and 2 of the patent, and that the subsequent heating step merely coats the irregular shapes.

It is one object of the present invention to provide an improved electrical stress controlling composition that is based on zinc oxide and that exhibits non-linear electrical behaviour.

In accordance with one aspect of the present invention, there is provided an electrical stress-controlling composition, comprising
(a) a polymeric matrix, and
(b) a particulate filler comprising doped zinc oxide varistor powder;
wherein
(i) the particles of the filler are calcined at a temperature between 800° C. and 1400° C., and subsequently broken up such that substantially all of the particles retain their original, substantially spherical, shape,
(ii) at least 85% of the weight of the filler comprises zinc oxide,
(iii) more than 50% by weight of the filler particles have a maximum dimension of between 5 and 100 micrometers, such that the composition exhibits non-linear electrical behaviour whereby its specific impedance decreases by at least a factor of 10 when the electric field is increased by less than 5 kV/cm at a region within an electrical field range of 5 kV/cm to 50 kV/cm, and (iv) the filler comprises between 5% and 60% of the volume of the total composition.

The teaching of the prior art in respect of non-linear zinc oxide filler polymeric material is that a powder obtained from a sintered body and having a particle size greater than 100 micrometers (EdF) and less than 200 micrometers (ABB) is prefered for stress control purposes. The present invention, in contrast, requires a smaller particle size, and realises that grinding a compressed block to provide the powder results in particles of an irregular shape, which can be disadvantageous. In the latter respect, it is to be noted that the calcination of the present invention is high temperature heating under gravity without any compression. The resulting form-stable body needs little force to be broken up, for example by light grinding and this minimises the percentage of particles, say about 5%, that are caused to have an irregular shape rather than the smooth, generically spherical, shape of the particles, which is the common shape of doped zinc oxide varistor powder as originally supplied by manufacturers.

Preferably all the particles of the filler have a maximum dimension of less than 100 micrometers, preferably less than 125 micrometers.

Preferably, not more than 15% by weight of the filler particles have a maximum dimension less than 15 micrometers.

The particle size is particularly relevant when the composition is formed into a sheet or tubular sleeve for application as a stress control layer in electrical applications such as electrical apparatus, cable joints cable terminations etc. Such a layer would typically be of the order of 1 mm thick, and if particles have a dimension comparable with the thickness, the surface can be rough and also air gaps can form, especially with particles of an irregular shape. In these circumstances partial electrical discharges can occur to an unacceptable extent. A powdered material sieved to a particle size of <200 micrometers, ie 0.2 mm as proposed by the ABB paper, would significantly increase the risk of undesirable electrical discharges in comparison with a material sieved to a particle size of <125 micrometers, i.e. 0.125 mm.

It is also pointed out that the ABB paper provides no teaching on the relevance of the size and or size distribution of the particles to the electrical behaviour of the composition. In accordance with the present invention, it has been found that, in addition to the requirement that all the particles have a size less than 125 micrometers, the average particle size of the fired powder as measured for a Gaussian distribution (either an actual Gaussian distribution, or a distribution transformed into a Gaussion one), should be between 20 and 60 micrometers, preferably between 25 and 50 micrometers, and most preferably between 35 and 45 micrometers.

Furthermore, it is preferred that less than 15%, and preferably less than 5%, by weight, of the particles should have a maximum dimension of less than 25 micrometers. If this condition is not met, then it has been found that the resistivity of the final composition is too high at high electrical field strength, with the effect that the switching point (to a lower specific impedance) takes place at a value too high to be of practical use for the typical stress control applications of the composition of the present invention.

The calcination of the filler takes place between 800° C. and 1400° C., and preferably between 950° C. and 1250° C., with 1100° C. being the most preferred nominal temperature. It will be appreciated that the optimum temperature of the calcination process will depend on the particular dopants present in the zinc oxide powder. A minimum temperature is needed to ensure that all the dopants are activated, that is to say melting and diffusion of the dopants takes place such that the resultant powder exhibits a sharp change in its impedance. Too high a temperature, however, may result in adverse chemical decomposition of the stress-control material. The powder needs to be maintained at the calcination temperature for a sufficient time to ensure uniform electrical properties throughout all the particles.

The calcination process is believed to result in the individual particles effectively exhibiting a 'varistor effect'. That is to say the particulate material is not only non-linear in respect of the variation of its a.c. electrical impedance characteristic (the relationship between the a.c. voltage applied to the material and the resultant current flowing therethrough), but it also exhibits a switching behaviour, in that the graph of voltage versus current shows an abrupt transition, which is quantified by the statement that the specific impedance of the material decreases by at least a factor of 10 when the electric field is increased by less than 5 kV/cm (at some region within an electric field range of 5 kV/cm to 50 kV/cm, and preferably between 10 kV/cm and 25 kV/cm,—being a typical operating range of the material when used in the joint or termination of an electric power cable). Preferably, the transition is such that the specified decrease takes place when the electric field is increased by less than 2 kV/cm within the range between 10 and 20 kV/cm. The non-linearity occurs in both the impedance of the material and also in its volume resistivity. The non-linearity of the filler particles may be different on each side of the switching point. It is also important that at the switching point the material simply significantly changes its non-linearity, and does not lead to electrical breakdown or flashover as the electrical stress is increased. The smaller the particle size for any given composition, the less is the likelihood of breakdown occurring beyond the switching point.

In contrast with the material according to U.S. Pat. No. 4,297,250, substantially all, that is to say at least 80% and preferably at least 90%, of the particles of the composition of the present invention retain their initial, substantially spherical, shape, with the advantage of improved electrical performance.

The point, that is to say the electrical stress, at which the composition switches between its higher impedance and its lower impedance values, can be selected to suit the application of the resultant product. This characteristic can be varied by selecting, for example, (i) the particular polymer matrix, or its relative permittivity, say within a range of 4 to 60, (ii) a suitable filler particle size, (iii) the volume content of the filler, and (iv) the calcination temperature and/or duration. The position of the switching point with respect to the value of the electrical stress will affect the impulse performance of a cable joint or termination, for example, to which the material is applied, and may be required to be different in different circumstances—as between a joint or a termination, for example. In the latter respect, impulse performance is improved if the switching point occurs at lower applied electrical field strengths. However, this means that the material is more conductive, and consideration has to be paid to the resultant heating of the material, which becomes greater the higher the voltage rating of the cable.

The use of particulate doped zinc oxide treated in this way allows the amount needed to be included in the polymeric matrix to be between 5% and 50%, and preferably between 10% and 40%, by volume, and results in the particle size being less than in the known composition referred to above, being such that more than 50% by weight of the filler particles have a maximum dimension of between 5 $\mu$m and 100 $\mu$m, and preferably between 25 $\mu$m and 75 $\mu$m. Advantageously, such particle dimensions apply to at least 60% by weight of the particles.

The volume content of the filler with respect to the polymeric matrix can be selected to provide the required impedance of the composition, for example being higher for material used to control the stress at the termination of an electric power cable than for a material used for stress control of a joint of the same cable operating at the same voltage rating.

The particle size is achieved by passing the particulate material through a suitably-sized, preferably 125 micrometer, sieve. Advantageously, the process of formation of the calcined particles results in them maintaining a smooth rather than a jagged or spiky outer surface, and they may be substantially oval or preferably spherical, rather than significantly elongate.

The particulate filler comprises at least 85%, and preferably at least 90%, by weight of zinc oxide. The remaining material, the dopants, may comprise some or all of the following for example, as would be known to those skilled in the art of doped zinc oxide varistor materials: $Bi_2O_3$, $Cr_2O_3$, $Sb_2O_3$, $Co_2O_3$, $MnO_3$, $Al_2O_3$, CoO, $Co_3O_4$, MnO, $MnO_2$, $SiO_2$, and trace amounts of lead, iron, boron and aluminium.

The polymeric matrix may comprise elastomeric materials, for example silicone or EPDM; thermoplastic polymers, for example polyethylene or polypropylene; adhesives, for example those based on ethylene-vinyl-acetate; thermoplastic elastomers; gels; thermosetting materials, for example epoxy resins; or a combination of such materials, including co-polymers, for example a combination of polyisobutylene and amorphous polypropylene.

The total composition may also comprise other well-known additives for those materials, for example to improve their processibility and/or suitability for particular applications. In the latter respect, for example, materials for use as power cable accessories may need to withstand outdoor environmental conditions. Suitable additives may thus include processing agents, stabilizers, antioxidants and plasticizers, for example oil.

The doped zinc oxide powder comprises between 5% and 60% of the volume of the total composition, and preferably exceeds 10%, more preferably 20% and most preferably 25%, and preferably is less than 50%, and more preferably less than 40% of the total volume.

The relative permittivity of the total composition preferably is within the range of 4 to 60, preferably exceeding 6, and more preferably exceeding 8, and preferably is less than 40 and more preferably is less than 25, measured at low electric field strength say about 2 V/mm, at 50 Hz. Furthermore, the permittivity preferably should not change by more than a factor of 2 at measurements up to 250 kHz.

The specific impedance of the total composition advantageously is within the range $10^8$ ohm-cm to $10^{10}$ ohm-cm, measured at low electric field strength (about 2 V/mm) at 50 Hz.

In accordance with another aspect of the present invention, there is provided electrical equipment, for example a joint or termination of an electric power cable, having applied thereto a layer of material comprising a stress-controlling composition as hereinbefore described with reference to the one aspect of the present invention.

The composition may be formed into a layer such as a tape or a sheet that can be wrapped around the equipment. Alternatively, the layer may be in the form of a tubular sleeve. The layer may also be provided as part of a co-extrusion, for example being an inner layer.

A layer of material formed from the composition of the invention may typically have a thickness of about 1 mm.

In one application, the composition of the present invention may form the stress-controlling wrapping of the cable termination disclosed in International Patent Application Publication Number WO 91/16564, the entire contents of which publication are included herein by this reference.

In accordance with another aspect of the present invention, there is provided a method of manufacturing an electrically non-linear composition, wherein
(a) a particulate filler comprising doped zinc oxide varistor powder is calcined under gravity and subsequently broken up such that substantially all of the particles retain their original, preferably substantially spherical, shape,
(b) the powder is passed through a 125 micrometer sieve, and
(c) the calcined and sieved powder is dispersed as a filler in a polymeric matrix.

Advantageously, the steps of the method, the filler, and the composition, are as set out hereinbefore with reference to said one aspect of the invention.

A stress controlling composition and a power cable terminated using the composition, each in accordance with the present invention, will now be described, by way of example, with reference to the accompanying drawings, in which.

Figure 1:
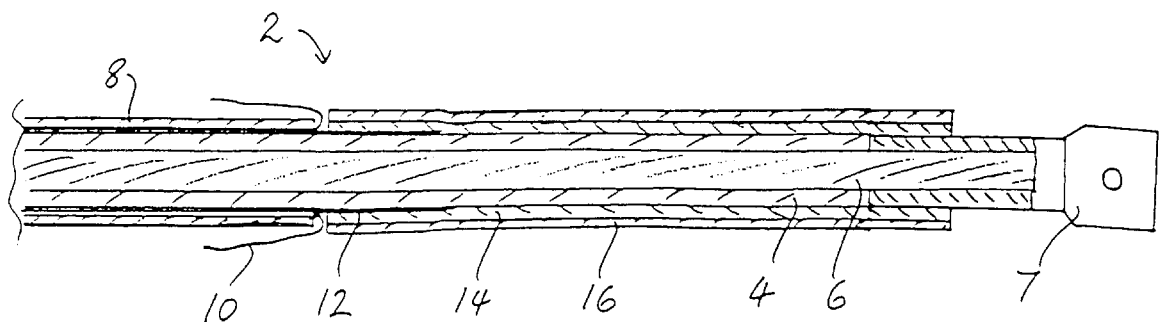
FIGS. 1 and 2 show sections through two forms of power cable terminations employing the stress control composition.

FIG. 1 shows a 20 kV terminated polymeric cable 2. The cable dielectric 4 has been stripped back to expose the conductor 6 for connection to other electrical equipment (not shown), such as switchgear, by means of a crimped lug 7. The cable insulating outer sheath 8 has been cut back to expose the armour wires 10 that have been folded back in preparation for being connected to earth. The semiconductive screen 12 extends beyond the sheath 8 but is cut back so as to terminate partway along the cable dielectric 4. The termination of the cable 2 is completed by the application thereto of a stress-control layer 14 and an outer heat shrinkable insulating layer 16. The layers 14 and 16 overlap the semiconductor screen 12 adjacent the end of the sheath 8, extend along the dielectric 4 to its cut back end, and overlap the shank of the lug 7. At one end, therefore, the stress-control layer 14 electrically contacts the screen 12 and is at earth potential, and at its other end, in operation, it is at the 20 kV potential of the conductor 6 and lug 7.

The layers 14 and 16 are formed as a single co-extruded tubing, although they could be formed and applied as separate tubings. It is also envisaged that in an alternative configuration, the stress-control layer, whether in tubular form or not, may be shorter than the outer insulating layer and may then extend from the screen 12 and terminate partway along the dielectric.

Figure 2:
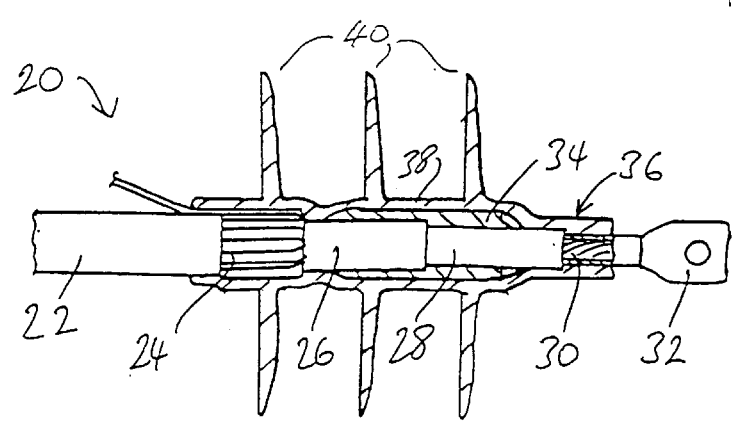

FIG. 2 shows an alternative cable termination, in which a cable 20 has its outer insulating sheath 22, earthing wires 24, semiconductive screen 26 and dielectric 28 cut back to expose the conductor 30, to which is crimped a connecting lug 32. A rectangular sheet 34 of stress control material is wrapped once around the cable 20 so as to overlap the screen 26 and to extend partway along the dielectric 28. An insulating elastomeric outer cover 36 that comprises a generally cylindrical core portion 38 with a plurality of rain sheds 40 extending therefrom, is applied to the cable 2 so as longitudinally to extend over the earth wires 24 at one end and over the lug 32 at its other end. The cover 36 may be applied by being progressively released radially on to the cable 2 from a holdout arrangement as disclosed in International Patent Application Publication No. WO 91/16564.

The material of the stress control tubing 14 of FIG. 1 and the sheet 34 of FIG. 2 comprises an electrically non-linear stress control composition in accordance with the present invention. The material in these embodiments comprises a matrix comprising silicone elastomer and a particulate filler comprising doped zinc oxide. The doped zinc oxide comprises approximately 90% by weight of zinc oxide and approximately 10% of $Bi_2O_3+Cr_2O_3+Sb_2O_3+CO_2O_3+MnO_3$.

The powder was calcined in a kiln at a temperature of about 1100° C., before being mixed with pellets of the polymer matrix and fed into an extruder to produce the final required form. The calcined filler comprised about 30% of the volume of the total composition comprising the filler and the polymeric matrix.

Figure 3:
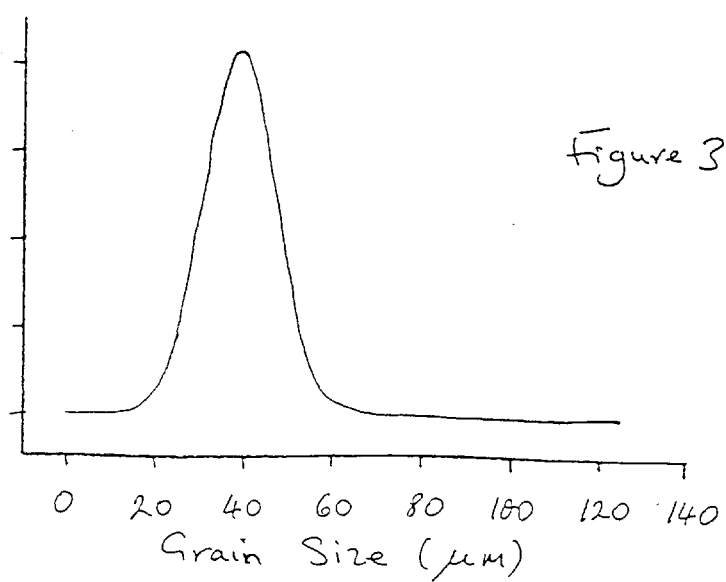
FIG. 3 is a graph of a typical particle size distribution of the calcined doped zinc oxide filler.

A typical particle size distribution of relative numbers of calcined doped zinc oxide particles of a suitable powder, after having been passed through a 125 micrometer sieve, is shown in FIG. 3, from which it can be seen that there is a sharp peak at a particle size of about 40 micrometers, with the large majority of particles being between 20 and 60 micrometers.

Figure 4:
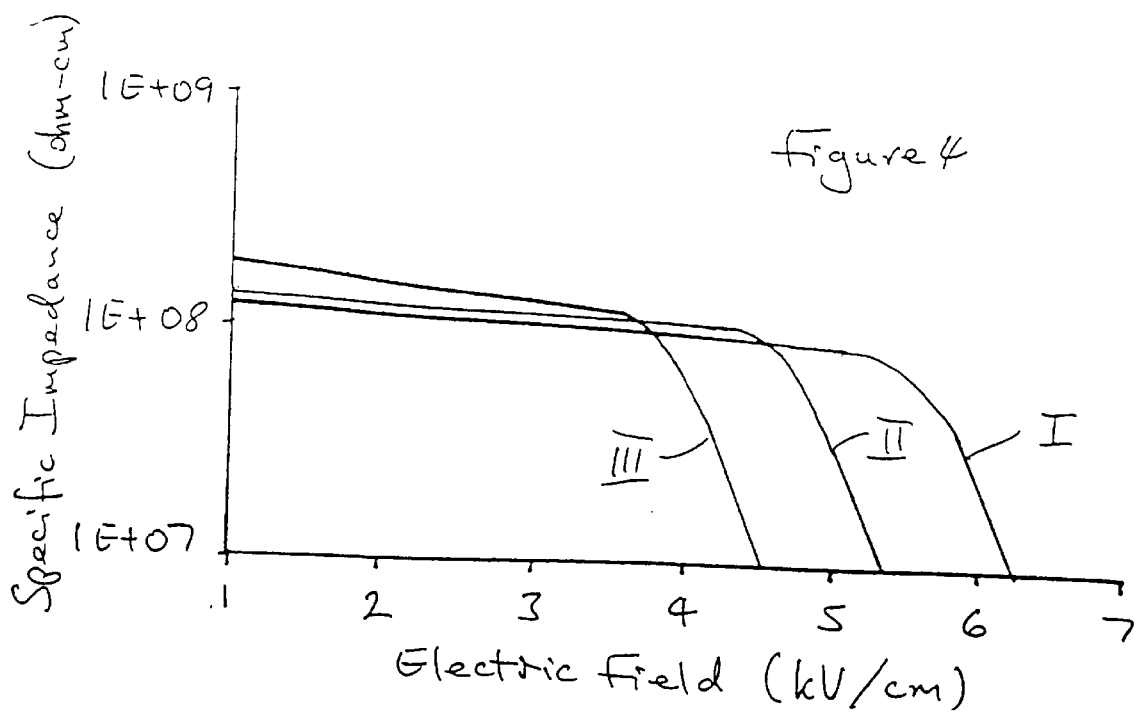
FIG. 4 is a graph of the impedance of the filler powder for various particle sizes.

The switching behaviour of the calcined doped zinc oxide particles, showing the abrupt change in non-linear specific impedance as a function of the electric field strength (at 50 Hz), is shown in FIG. 4 for three ranges of particle size. Curve I relates to a particle size of less than 25 $\mu$m, Curve II to a particle size of 25 $\mu$m to 32 $\mu$m and Curve III to a particle size of 75 $\mu$m to 125 $\mu$m. It is seen that the switching point occurs at higher electric field strength as the particle size is reduced.

Figure 5:
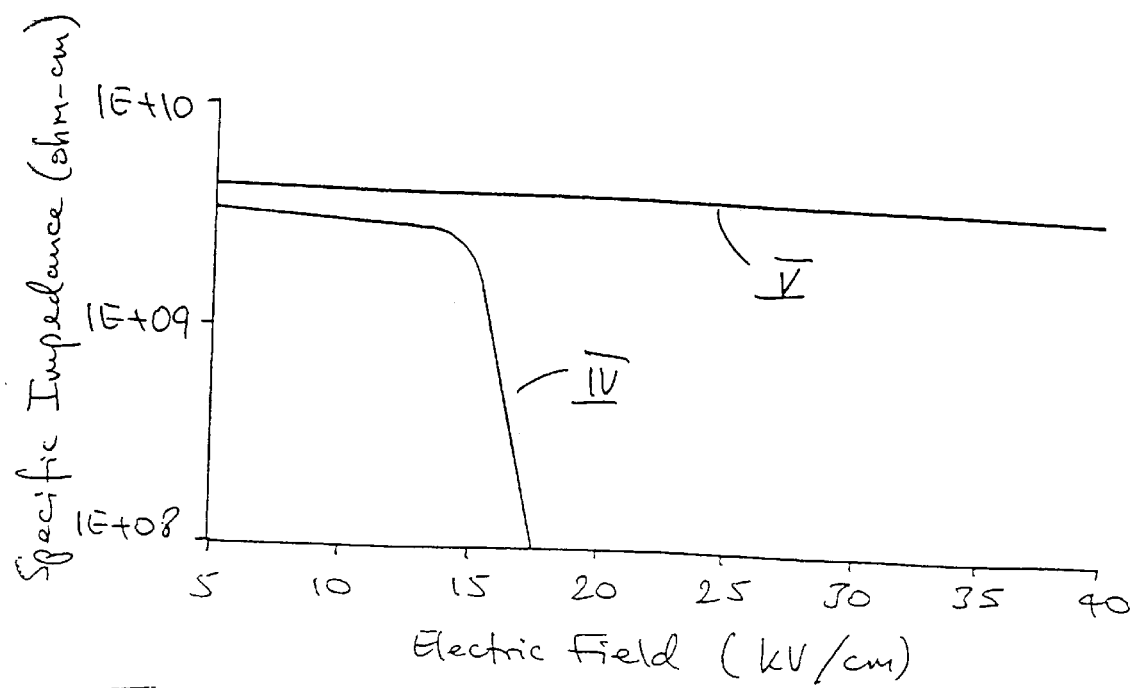
FIG. 5 is a graph of the specific impedance of the composition showing the effect of calcination of the filler.

FIG. 5 shows a comparison between the electrical behaviour, namely the variation of specific impedance of a composition of stress control material as a function of the electric field at 50 Hz, of particles that have been calcined, Curve IV, and particles that are otherwise identical but have not been calcined, Curve V. In these samples, the zinc oxide powder formulation given above formed 35% by volume of a silicone elastomer that provided the polymeric matrix. It is evident that no switching behaviour occurs, even at significantly high electric field strengths, with the material whose particles have not been calcined, even though that material does exhibit non-linear behaviour.

The stress control composition of the present invention thus exhibits significant advantages over known stress control materials.

What is claimed is:

1. An electrical stress- controlling composition, comprising:
   (a) a polymeric matrix, and
   (b) a particulate filler comprising doped zinc oxide varistor powder; wherein
      (i) the particles of the filler are calcined at a temperature between 800° C. and 1400° C., and subsequently broken up such that substantially all of the particles retain their original shape,
      (ii) at least 85% of the weight of the filler comprises zinc oxide,
      (iii) more than 50% by weight of the filler particles have a maximum dimension of between 5 and 100 micrometers such that the composition has a specific impedance that decreases by at least a factor of 10 when subjected to an electric field increase of less than 5 kV/cm at a region within an electrical field range of 5 kV/cm to 50 kV/cm,
      (iv) the filler comprises between 5% and 60% of the volume of the total composition; and
      (v) the particles of the filler are generally spherical.

2. A composition according to claim 1, wherein all the particles of the filler have a maximum dimension of less than 100 micrometers.

3. A composition according to claim 1 or claim 2, wherein not more than 15% by weight of the filler particles have a maximum dimension less than 15 micrometers.

4. A composition according to claim 1 or claim 2, wherein the filler particles are calcined at a temperature between 950° C. and 1250° C.

5. A composition according to claim 1 or claim 2, wherein at least 90% of the weight of the filler comprises zinc oxide.

6. A composition according to claim 1 or claim 2, wherein more than 50% by weight of the filler particles have a maximum dimension of between 25 and 75 micrometers.

7. A composition according to claim 1 or claim 2, wherein the filler comprises between 10% and 40% of the volume of the total composition.

8. A layer of material comprising a stress-controlling composition in accordance with claim 1 or claim 2.

9. A joint or termination of an electric power cable having applied thereto a layer of material according to claim 8.

10. A composition according to claim 1 wherein the specific impedence of the composition is substantially unchanged when subjected to an electrical field range of less than 5 kV/cm.

11. An electrical stress-controlling composition, comprising:
   a polymeric matrix; and
   a plurality of filler particles comprising:
      (a) a zinc oxide varistor powder; and
      (b) a dopant layer on particles of the zinc oxide varistor powder, the dopant layer being selected from the group consisting of $Bi_2O_3$, $Cr_2O_3$, $Sb_2O_3$, $Co_2O_3$, $MnO_3$, $Al_2O_3$, CoO, $Co_3O_4$, MnO, $MnO_2$, $SiO_2$, and trace amounts of lead, iron, boron and aluminum; wherein
      (i) the filler particles are calcined at a temperature of between about 800° C. and about 1400° C., and subsequently broken up such that substantially all of the filler particles retain their original shape;
      (ii) at least about 85% of the weight of the filler particles comprises zinc oxide;
      (iii) more than about 50% by weight of the filler particles have a maximum dimension of between about 5 and about 100 micrometers; and
      (iv) the filler particles comprise between about 5% and about 60% of the volume of the electrical stress-controlling composition.

12. A composition according to claim 11 wherein the composition has a specific impedance that decreases by at least about a factor of 10 when subjected to an electric field increase of less than about 5 kV/cm at a region within an electrical field range of about 5 kV/cm to about 50 kV/cm.

13. A composition according to claim 12 wherein the specific impedance of the composition is substantially unchanged when subjected to an electrical field range of less than about 5 kV/cm.

14. A composition according to claim 12 wherein the dopant layer is selected from the group consisting of $Bi_2O_3$, $Cr_2O_3$, $Sb_2O_3$, $Co_2O_3$ and $MnO_3$.

15. A composition according to claim 12, wherein the particles of the filler have a maximum dimension of less than about 125 micrometers.

16. A composition according to claim 15, wherein not more than about 15% by weight of the filler particles have a maximum dimension of less than about 15 micrometers.

17. A composition according to claim 12 wherein the filler particles are calcined at a temperature of between about 950° C. and about 1250° C.

18. A composition according to claim 12, wherein at least about 90% of the filler particles by weight comprises zinc oxide.

19. A composition according to claim 12, wherein more than about 50% by weight of the filler particles have a maximum dimension of between about 25 and about 75 micrometers.

20. A composition according to claim 12, wherein the filler particles comprise between about 10% and about 40% of the volume of the composition.

21. An electrical stress control apparatus for an electrical power cable comprising:
- a cover configured to be placed over the electrical power cable; and
- an electrical stress-controlling composition positioned between the cover and the electrical power cable, the electrical stress-controlling composition comprising:
  (a) a polymeric matrix, and
  (b) a particulate filler comprising doped zinc oxide varistor powder;
- wherein
  (i) the particles of the filler are calcined at a temperature of between about 800° C. and about 1400° C., and subsequently broken up such that substantially all of the particles retain their original shape;
  (ii) at least about 85% of the weight of the filler particles comprises zinc oxide;
  (iii) more than about 50% by weight of the filler particles have a maximum dimension of between about 5 and about 100 micrometers;
  (iv) the composition has a specific impedance that decreases by at least about a factor of 10 when subjected to an electric field increase of less than about 5 kV/cm at a region within an electrical field range of about 5 kV/cm to about 50 kV/cm;
  (v) the filler particles comprise between about 5% and about 60% of the volume of the composition; and
  (vi) the filler particles are generally spherical.

22. An apparatus according to claim 21 wherein the specific impedance of the composition is substantially unchanged when subjected to an electrical field range of less than about 5 kV/cm.

23. An electrical stress control apparatus for an electrical power cable comprising:
- a cover configured to be placed over the electrical power cable; and
- an electrical stress-controlling composition positioned between the cover and the electrical power cable, the electrical stress-controlling composition comprising:
- a polymeric matrix; and
- a plurality of filler particles comprising:
  (a) a zinc oxide varistor powder; and
  (b) a dopant layer on particles of the zinc oxide varistor powder, the dopant layer being selected from the group consisting of $Bi_2O_3$, $Cr_2O_3$, $Sb_2O_3$, $Co_2O_3$, $MnO_3$, $Al_2O_3$, $CoO$, $Co_3O_4$, $MnO$, $MnO_2$, $SiO_2$, and trace amounts of lead, iron, boron and aluminum;
- wherein
  (i) the filler particles are calcined at a temperature of between about 800° C. and about 1400° C., and subsequently broken up such that substantially all of the filler particles retain their original shape;
  (ii) at least about 85% of the weight of the filler particles comprises zinc oxide;
  (iii) more than about 50% by weight of the filler particles have a maximum dimension of between about 5 and about 100 micrometers; and
  (iv) the filler particles comprise between about 5% and about 60% of the volume of the electrical stress-controlling composition.

24. An apparatus according to claim 23 wherein the composition has a specific impedance that decreases by at least about a factor of 10 when subjected to an electric field increase of less than about 5 kV/cm at a region within an electrical field range of about 5 kV/cm to about 50 kV/cm and wherein the specific impedence is substantially unchanged when subjected to an electrical field range of less than about 5 kV/cm.

25. An apparatus according to claim 24 wherein the specific impedance of the composition is substantially unchanged when subjected to an electrical field range of less than 5 kV/cm.

* * * * *